March 1, 1966  K. A. HARPER  3,238,111
MINIMIZATION OF TIME LAG IN THE AUTOMATIC CONTROL OF A
FRACTIONAL DISTILLATION SYSTEM
Filed June 8, 1962
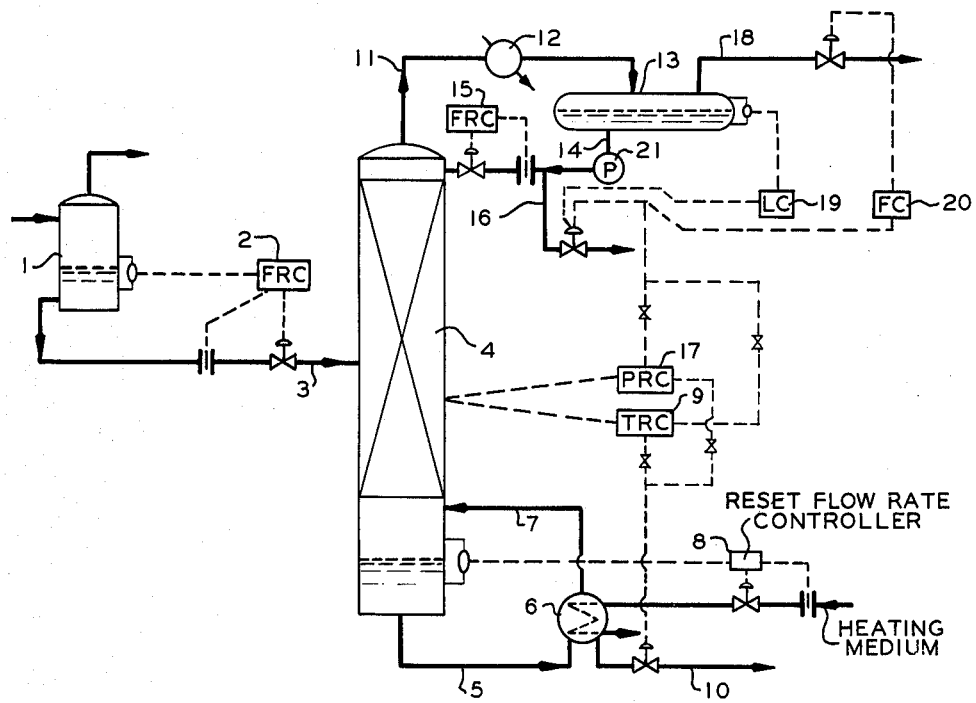
INVENTOR.
K.A. HARPER
BY Young & Quigg
ATTORNEYS

3,238,111
MINIMIZATION OF TIME LAG IN THE AUTOMATIC CONTROL OF A FRACTIONAL DISTILLATION SYSTEM
Kenneth A. Harper, Bartlesville, Okla., assignor to Phillips Petroleum Company, a corporation of Delaware
Filed June 8, 1962, Ser. No. 201,110
12 Claims. (Cl. 203—2)

This invention relates to fractional distillation tower control. In one aspect it relates to fractional distillation tower control wherein the time lag between occurrence of a disturbance and its correction is minimized. In another aspect it relates to apparatus and method for control of operation of a fractional distillation column having a variable feed flow and/or a variable feed composition wherein the time lag between occurrence of a disturbance and its correction is minimized.

One of the difficulties in the control of fractional distillation columns is the length of time between the time a correctional change is made in response to a sensed process upset and the time the correctional change becomes effective at the point at which the sensed process upset was noted. One of the operational variables frequently considered relatively important is change in composition of the feed stock to be fractionated. The feed rate also, in many instances, is irregular.

An object of this invention is to provide apparatus and a method for effectively operating a fractional distillation column. Another object of this invention is to provide apparatus and a method for controlling a fractional distillation column to which a feed stock varies in composition, and/or flow rate. Yet another object of this invention is to provide apparatus and a method for operation of such a fractional distillation column wherein the time lag between upset and cure is markedly reduced. Still other objects and advantages of this invention will be realized upon reading the following description which, taken with the attached drawing, forms a part of this specification.

The drawing illustrates, in diagrammatic form, an arrangement of apparatus parts suitable for practicing the method of this invention.

According to this invention I employ a pressure-responsive controller and a temperature-responsive controller, responsive to pressure and to temperature, respectively, on the same tray in a fractional distillation column. This tray is positioned between the feed level and the kettle section. Preferably, the temperature and pressure points are well below the feed level and particularly near the kettle section. In one instance this tray is the seventh tray up from the kettle section of a 50-tray column.

In one embodiment the pressure sensing controller regulates the top tower yield or make and the temperature sensing controller regulates the bottom tower yield. In another embodiment the controls are reversed, i.e., the temperature sensing controller regulates the top tower make and the pressure sensing controller regulates the bottom tower make.

Referring now to the drawing in reference to the first mentioned embodiment, reference numeral 1 identifies a surge tank in which a process stream is accumulated prior to treatment in a fractional distillation vessel or column 4. A flow recorder controller assembly 2 regulates and records the rate of flow of charge liquid from tank 1 through a conduit 3 to the fractional distillation vessel 4. Column 4 is provided with suitable vapor-liquid contact promoting apparatus such as bubble cap trays. In the instance mentioned hereinabove, this column is provided with about 50 trays. A conduit 5 is provided at the bottom of the column for outlet of the kettle product. Conduit 5 passes column bottoms to a reboiler 6 and a portion of the heated bottoms passes through a conduit 7 for return to the kettle section. The make bottoms product portion is withdrawn from reboiler 6 through a conduit 10 for such disposal as desired. A temperature recorder-controller assembly 9 comprises a temperature sensing element, such as a thermocouple, inserted through the wall of column 4 at the level of the seventh tray. This temperature recorder-controller assembly also includes a valve in conduit 10 for regulation of the rate of flow of bottoms make product and emits a pneumatic signal in response to sensed temperature. A temperature recorder-controller, such as one identified by Model M–40, is manufactured by the Foxboro Company of Foxboro, Massachusetts, and is suitable for use in this invention. A level-recorder-controller assembly 8, such as a Foxboro M–58–4 controller, is positioned to regulate the rate of flow of heating medium, such as steam, to reboiler 6 in response to a level of liquid in the kettle section of column 4. This controller emits a pneumatic signal in response to sensed liquid level. A liquid level recorder-controller suitable for regulating the rate of flow of heating medium is a reset flow controller Foxboro type M–40. Such a flow controller is described in Foxboro bulletin 450.

A conduit 11 passes overhead vapors from column 4 to a condenser 12 with the condensate and uncondensed vapors passing on to an accumulator tank 13. A conduit 18 is provided for outlet of uncondensed vapors while a conduit 14 passes condensate to a pump 21. A portion of the condensate as regulated by a flow rate controller 15 passes into the upper or reflux section of column 4 as reflux while the remainder of the condensate passes through a conduit 16 for such disposal as desired.

A pressure recorder-controller 17, which also emits a pneumatic signal in response to sensed pressure, actuates a motor valve in conduit 16 to allow passage of make condensate from accumulator tank 13 in response to pressure as sensed on the above-mentioned seventh tray. A flow controller 20 is provided to receive a signal also from pressure recorder-controller 17 and to actuate a motor valve in conduit 18 for regulation of the flow of uncondensed gas yield through this conduit. A level controller assembly 19 is provided to override the operation of the motor valve in conduit 16 from pressure recorder-controller 17 in such a manner as to withdraw excess condensate from the condensate accumulator 13.

The Foxboro Company level controller type M–58–4 is suitable for use as level controller 19. Flow controller 20 can also be one of the Foxboro M–40 type, as mentioned hereinabove. While Foxboro instruments have been identified and mentioned herein as suitable pieces of equipment for use in this invention, it will be realized that similar instruments manufactured by other instrument manufacturing companies are also equally suitable for the purpose at hand.

Flow rate recorder-controller 15 regulates the passage of reflux condensate through conduit 14 to the reflux section of vessel 4 in such a manner as to maintain a constant or predetermined rate of flow of condensate.

According to this invention, as the concentration of higher boiling constituents of a feed stock increases, the temperature at the temperature sensing tray 7 increases because of reduced cooling by less vaporization of the feed added to the tower. This increase in temperature is sensed on tray 7 by the temperature sensing device at this location and a signal responsive thereto is passed to the temperature recorder-controller instrument which, in turn, regulates the valve in conduit 10 to open the valve somewhat for increasing the flow of the bottoms product from the fractionator. Since a reset flow rate controller 8 has previously been set to allow passage of a predetermined rate of flow of heating medium, upon lowering of the level of the contents in the kettle, the drop in liquid level causes a resetting of the set point of the reset flow rate controller 8 to decrease the rate of flow of heating medium so as to provide less stripping vapors for passing upwardly through the column.

Upon increasing the rate of flow of bottoms material through conduit 10, and due to less vapor formation per unit of volume of the heavier feed, the pressure sensing device at the above-mentioned seventh tray of the column senses a decrease in pressure and passes a signal to the pressure recorder-controller 17 which, in turn, passes a signal to the motor valve in conduit 16 to throttle this valve thereby reducing the rate of withdrawal of condensate from accumulator 13. This reduction in withdrawal of condensate from accumulator 13 offsets the increase rate of flow of bottoms product thereby maintaining pressure in the column at substantially its original and predetermined value. This entire operation, i.e., the regulation of the rate of flow of bottoms product through conduit 10, has a substantially immediate effect on the pressure in the column and the pressure-sensing device, in co-operation with the pressure recorder-controller 17, actuates the motor valve in conduit 16 which, as mentioned, throttles the flow of overhead product thereby tending to prevent reduction of pressure in the column. All of these control operations transpire in a relatively short period of time so that upon the first sensing of a temperature decrease on tray 7 the correction required in response to this temperature decrease is quite rapid, because there is no delay, as conventionally experienced, in waiting for liquid to run down the tower.

When the feed passing through conduit 3 into fractionator 4 increases in the more volatile constituents, the opposite effect from that described hereinbefore results. In this case the pressure in the column tends to increase, resulting in actuation of the pressure recorder-controller 17 to open the motor valve in conduit 16 for outlet of condensate at a more rapid rate in order to reduce the pressure in the column. This pressure increase in column 4 and at the seventh tray is accompanied by a temperature decrease at this point and this temperature decrease operates through the temperature recorder-controller 9 to reduce the rate of flow of bottoms material through conduit 10. With reduced bottoms yield, the bottom level rises and the level controller increases heat for reboil so as to strip out more effectively the overload of lower boiling constituents.

When the level of feed liquid in surge tank 1 rises, the rate of flow of liquid through conduit 3 is increased and this increased volume flow causes an increase in bottoms level and a slight increase in column pressure (along with a slight temporary decrease in temperature). This increase in bottoms level effects by way of the level controller an increase in heat flow to the column by way of the reboiler. As more heat is added to the column, temperature increases and this temperature rise increases the opening of the valve on the bottoms yield. Upon addition of still more heat to the tower, vaporization increases and, along with the increased feed rate, the column pressure increases and the overhead make valve opens further to increase overhead make flow.

In one conventional fractionator operation, when column pressure is controlled from the top of the column and temperature below the feed level, a time lag of about 10 minutes elapses between the time an upset is sensed and the time the upset is corrected and the operation has returned to normal.

According to this invention when pressure and temperature are sensed at the same point, the time lag between the time an upset is sensed and the time the upset is corrected and the operation returned to normal is reduced to from 2 to 3 minutes.

The following temperature and pressure conditions are exemplary of conditions maintained in a fractional distillation column according to this invention. The feed stock temperature is about 230° F., the overhead vapor temperature is about 137° F. and the top tower pressure is about 163 p.s.i.g. (pounds per square inch gauge). These conditions are for a feed stock containing hydrocarbons from $C_2$"s through $C_5+$ as illustrated in the accompanying table.

The following tabulation illustrates the composition of the alkylation process effluent as fed to the fractional distillation zone of this invention. The composition of the overhead material given in this tabulation is for that material flowing through conduit 11 which includes condensate and uncondensed material passing through conduits 16 and 18. The composition of the bottoms is for that material passing through conduit 10.

| | Pounds/Hour | | |
|---|---|---|---|
| | Feed | Overhead | Bottoms |
| $C_2$'s | 3,505 | 3,505 | Trace |
| $C_3$'s | 3,900 | 2,828 | 1,072 |
| $iC_4$ | 2,456 | 2,322 | 134 |
| $nC_4$ | 582 | 515 | 67 |
| $C_5+$ | 32,200 | Trace | 32,200 |
| Totals | 42,643 | 9,170 | 33,473 |

The reflux accumulator 13 is maintained at about 94° F. and 157 p.s.i.g. When the feed rate to this column is about 324 barrels per hour, I employ about 147.6 barrels per hour of reflux to the column with the make reflux condensate product being about 47.3 barrels per hour. The bottoms make material in this case is about 130.5 barrels per hour. This feed material is an alkylation operation effluent and the condensate make product is suitable as an alkylation feed return material to the process while the kettle product is a stabilized high octane gasoline product.

The normal operating temperature on the seventh tray from the kettle in this instance is about 270° F. while pressure at this point is about 168 p.s.i.g. The normal kettle temperature is about 306° F. while the pressure is about 170 p.s.i.g. The temperature of the kettle product issuing from the reboiler 6 through conduit 7 to the kettle for reboiling purposes is about 336° F. The temperature of the stabilized gasoline product flowing through conduit 10 is about 385° F.

The controllers 8, 9 and 17 have been disclosed as being pneumatic controllers, that is, controllers which emit pneumatic control signals in response to a sensed condition. However, if desired, these controllers can be electrical controllers. The 2, 15, 19 and 20 can be pneumatic controllers or electrical controllers, as desired.

While the hereinabove operation has been described with the pressure and temperature sensing points being on the seventh tray up from the bottom in a 50-tray fractionator, the pressure and temperature sensing points can be on any tray in the column as long as they are on the same tray. However, it is preferred that pressure and temperature be sensed below the feed tray.

The other or alternate embodiment mentioned hereinbefore involves use of the temperature controller 9 for controlling the tower pressure, i.e., by regulating the rate of top tower make in conduit 16, and use of the pressure controller 17 for controlling the tower temperature, i.e., by regulating the rate of bottom make in conduit 10.

To employ the embodiment previously explained the valves in the pneumatic control conduits leading directly from pressure recorder-controller 17 to the valve in conduit is opened and the valve in the bypass conduit leading from temperature recorder-controller 9 to the valve in conduit 16 is closed. The valve in the pneumatic control conduit leading from temperature recorder-controller 9 directly to the valve in conduit 10 is open and the valve in the bypass conduit leading from pressure recorder-controller 17 to the valve in conduit 10 is closed. To operate according to the alternate embodiment these control conduit valves are merely reversed so that only the signal from pressure recorder-controller 17 will pass to the valve in conduit 10 and only the signal from temperature recorder-controller 9 will pass to the valve in conduit 16.

In the alternate embodiment the detailed operation is the same as in the first described embodiment, the only difference being substitution of a pressure controller for a temperature controller and vice versa.

While I have explained and illustrated the apparatus and the operation thereof for fractionally distilling an alkylation operation effluent, it will be realized by those skilled in the art that this invention is operable for other types of feed stock. For example, it can be used for the fractional distillation of a wide boiling range naphtha into an overhead product and a kettle product. Furthermore, a cracking operation effluent can be fractionated into a light crack naphtha and a heavy crack naphtha.

While certain embodiments of the invention have been described for illustrative purposes, the invention obviously is not limited thereto.

That which is claimed is:

1. A method for operating a fractional distillation column comprising introducing into said column a feed stock to be fractionally distilled and therein fractionally distilling said feedstock, withdrawing an overhead vaporous stream from a upper portion of said column, cooling said overhead vaporous stream to condense at least a portion of said overhead vaporous stream to form condensate, passing the thus cooled and at least partially condensed overhead vaporous stream into an accumulator, introducing at a substantially constant rate a portion of said condensate from said accumulator into an upper portion of said column as reflux for said column, withdrawing the remainder of said condensate from said accumulator as a liquid overhead product, adding reboiling heat to the contents of the kettle section of said column, sensing temperature and pressure at the same level within said column, withdrawing kettle product from said column, controlling the rate of withdrawal of said kettle product from said column responsive to one of the thus sensed pressure and temperature, and controlling the rate of withdrawal of said remainder of said condensate from said accumulator responsive to the other of said thus sensed pressure and temperature to maintain said thus sensed pressure and temperature substantially constant.

2. A method in accordance with claim 1 wherein said rate of withdrawal of said kettle product is controlled responsive to said sensed pressure and the rate of withdrawal of said remainder of said condensate is controlled responsive to said sensed temperature.

3. A method in accordance with claim 1 wherein said rate of withdrawal of said kettle product is controlled responsive to said sensed temperature and the rate of withdrawal of said remainder of said condensate is controlled responsive to said sensed pressure.

4. A method for operating a fractional distillation column comprising introducing into said column a feed stock to be fractionally distilled and therein fractionally distilling said feed stock, withdrawing an overhead vaporous stream from an upper portion of said column, cooling said overhead vaporous stream to condense at least a portion of said overhead vaporous stream to form condensate, passing the thus cooled and at least partially condensed overhead vaporous stream into an accummulator, introducing at a substantially constant rate a portion of said condensate from said accumulator into an upper portion of said column as reflux for said column, withdrawing the remainder of said condensate from said accumulator as a liquid overhead product, adding reboiling heat to the contents of the kettle section of said column, sensing temperature and pressure at the same level within said column, said level being below the point of introduction of said feed stock into said column and above the said kettle section, withdrawing kettle product from said column, controlling the rate of withdrawal of said kettle product from said column responsive to the thus sensed temperature, controlling the rate of withdrawal of said remainder of said condensate from said accumulator responsive to the thus sensed pressure, sensing the liquid level in said accumulator, and overriding said controlling the rate of withdrawal of said remainder responsive to the thus sensed liquid level, to maintain said sensed pressure and temperature substantially constant.

5. A method for operating a fractional distillation column comprising introducing into said column a feed stock to be fractionally distilled and therin fractionally distilling said feed stock, withdrawing an overhead vaporous stream from an upper portion of said column, cooling said overhead vaporous stream to condense at least a portion of said overhead vaporous stream to form condensate passing the thus cooled and at least partially condensed overhead vaporous stream into an accumulator, introducing at a substantially constant rate a portion of said condensate from said accumulator into an upper portion of said column as reflux for said column, withdrawing the remainder of said condensate from said accumulator as a liquid overhead product, withdrawing the uncondensed gases from said accumulator, adding reboiling heat to the contents of the kettle section of said column, sensing temperature and pressure at the same level within said column, said level being below the point of introduction of said feed stock into said column and above said kettle section, withdrawing kettle product from said column, controlling the rate of withdrawal of said kettle product from said column responsive to the thus sensed temperature, controlling the rate of withdrawal of said remainder of said condensate from said accumulator responsive to the thus sensed pressure, and controlling the rate of withdrawal of said uncondensed gases from said accumulator responsive to said sensed pressure, to maintain said sensed pressure and temperature substantially constant.

6. A method for operating a fractional distillation column comprising introducing into said column a feed stock to be fractionally distilled and therein fractionally distilling said feed stock, withdrawing an overhead vaporous stream from an upper portion of said column, cooling said overhead vaporous stream to condense at least a portion of said overhead vaporous stream to form condensate, passing the thus cooled and at least partially condensed overhead vaporous stream into an accumulator, introducing at a substantially constant rate a portion of said condensate from said accumulator into an upper portion of said column as reflux for said column, withdrawing the remainder of said condensate from said accumulator as a liquid overhead product, withdrawing the uncondensed gases from said accumulator, adding reboiling heat to the contents of the kettle section of said column, sensing temperature and pressure at the same level within said column, said level being below the point of introduction of said feed stock into said column and above said kettle section, withdrawing kettle product from said column, controlling the rate of withdrawal of said kettle product from said column responsive to the thus sensed temperature, controlling the rate of withdrawal of said remainder of said condensate from said accumulator responsive to the thus sensed pressure, controlling the rate of withdrawal of said uncondensed gases from said accumulator responsive to said sensed pressure, sensing the liquid level in said accumulator, and overriding said controlling the rate of withdrawal of said remainder responsive to the thus sensed liquid level, to maintain said sensed pressure and temperature substantially constant.

7. Apparatus comprising a fractional distillation column, means for introducing into said column at a point intermediate the ends of said column a feed stock to be fractionally distilled, an accumulator, means for withdrawing an overhead vaporous stream from the upper portion of said column, means for cooling the thus withdrawn overhead vaporous stream to condense at least a portion of said overhead vaporous stream to form condensate, means for passing the thus cooled and at least partially condensed overhead vaporous stream into said accumulator, means for withdrawing a first portion of the condensate from said accumulator and passing the thus withdrawn first portion at a substantially constant rate into an upper portion of said column as reflux, means for withdrawing a second portion of the condensate from said accumulator as a liquid overhead stream, means for adding reboiling heat to the contents of the kettle section of said column, means for withdrawing a kettle product from said kettle section, means for sensing pressure and temperature at the same level within said column, means for controlling the rate of withdrawal of said second portion of said condensate responsive to one of the thus sensed pressure and temperature and means for controlling the rate of withdrawal of said kettle product responsive to the other of said thus sensed pressure and temperature to maintain said sensed pressure and temperature substantially constant.

8. Apparatus in accordance with claim 7 wherein said means for controlling the rate of withdrawal of said second portion comprises means for controlling the rate of withdrawal of said second portion responsive to said sensed temperature, and wherein said means for controlling the rate of withdrawal of said kettle product comprises means for controlling the rate of withdrawal of said kettle product responsive to said sensed pressure.

9. Apparatus in accordance with claim 7 wherein said means for controlling the rate of withdrawal of said second portion comprises means for controlling the rate of withdrawal of said second portion responsive to said sensed pressure, and wherein said means for controlling the rate of withdrawal of said kettle product comprises means for controlling the rate of withdrawal of said kettle product responsive to said sensed temperature.

10. Apparatus in accordance with claim 9 further comprising means for sensing the liquid level in said accumulator and for overriding responsive to the thus sensed liquid level the control of said rate of withdrawal of said second portion of said condensate.

11. Apparatus in accordance with claim 9 further comprising means for withdrawing uncondensed gases from said accumulator at a rate responsive to said sensed pressure.

12. Apparatus in accordance with claim 11 further comprising means for sensing the liquid level in said accumulator and for overriding responsive to the thus sensed liquid level the control of said rate of withdrawal of said second portion of said condensate.

References Cited by the Examiner

UNITED STATES PATENTS

| | | | |
|---|---|---|---|
| 2,022,809 | 12/1935 | Kramer | 202—160 X |
| 2,456,398 | 12/1948 | Gerhold | 202—160 X |
| 2,725,351 | 11/1955 | Grote | 202—160 |
| 2,890,156 | 6/1959 | Vautrain | 202—160 |
| 3,004,089 | 10/1961 | Hutto | 196—132 X |
| 3,020,213 | 2/1962 | Lupfer | 202—160 |

FOREIGN PATENTS

| | | |
|---|---|---|
| 478,116 | 10/1951 | Canada. |
| 740,014 | 5/1943 | Germany. |

OTHER REFERENCES

Instruments and Process Control: Published by New York State Vocational and Practical Arts Association, 1945 (pages 165–171 relied on).

ROBERT F. BURNETT, *Primary Examiner.*

NORMAN YUDKOFF, *Examiner.*